United States Patent [19]

Derouet et al.

[11] Patent Number: 5,531,566
[45] Date of Patent: Jul. 2, 1996

[54] SELF REGULATING BLEED VALVE

[75] Inventors: Patrick R. J. Derouet, Soignolles en Brie; Michel S. Guimier, Grandpuits, both of France

[73] Assignee: Societe Nationale D'Etude et de Construction de Moteurs D'Aviation S.N.E.C.M.A., Paris Cedex, France

[21] Appl. No.: 518,721

[22] Filed: Aug. 24, 1995

[30] Foreign Application Priority Data

Aug. 24, 1994 [FR] France .................................. 94 10237

[51] Int. Cl.$^6$ ............................................. F01D 17/00
[52] U.S. Cl. ......................... 415/145; 415/144; 415/146; 415/147; 60/39.07
[58] Field of Search .................................. 415/17, 28, 36, 415/42, 144, 145, 146, 147; 60/39.07, 39.29; 251/208

[56] References Cited

U.S. PATENT DOCUMENTS

| 2,546,432 | 3/1951 | Darling ................................. 60/39.07 |
| 3,487,767 | 1/1970 | Kristiansen . |
| 3,909,152 | 9/1975 | Rannenberg . |
| 3,915,587 | 10/1975 | Rannenberg . |
| 5,279,109 | 1/1994 | Liu et al. . |

FOREIGN PATENT DOCUMENTS

| 1182604 | 6/1959 | France ................................. 60/39.07 |
| 2257787 | 8/1975 | France . |
| 2680832 | 3/1993 | France . |
| 497672 | 11/1970 | Switzerland . |
| 113718 | 7/1918 | United Kingdom . |
| 906541 | 9/1962 | United Kingdom . |
| 2243871 | 11/1991 | United Kingdom . |

*Primary Examiner*—Edward K. Look
*Assistant Examiner*—Christopher Verdier
*Attorney, Agent, or Firm*—Bacon & Thomas

[57] ABSTRACT

A self regulating bleed valve for a gas turbine engine is provided which taps or bleeds a portion of a gas, typically air, from a duct of the gas turbine having a wall bounding the gas flow. The bleed valve has a valve member pivotally attached to the wall such that the valve member extends through a main opening formed in the wall. The valve member has an internal cavity in communication with a gas inlet opening and a gas exhaust opening and is pivotally movable between an extended position wherein the gas inlet opening portion of the valve member extends into the gas flow duct such that the inlet opening faces generally in an upstream direction so as to deflect a portion of gas flow into the internal cavity, and a retracted position wherein the inlet opening extends obliquely, generally parallel, to the gas flow so as to minimize the air tapped or bled from the gas flow. The bleed valve also includes a control device fixedly attached to the valve member which is acted on by the flow of gas to cause the valve member to pivot between its extended and retracted positions, depending upon the speed and pressure of the gas flow. Thus, the self-regulating bleed valve taps or bleeds a generally constant amount of air regardless of the speed or pressure of the gas flow with which the valve is associated.

11 Claims, 1 Drawing Sheet

SELF REGULATING BLEED VALVE

BACKGROUND OF THE INVENTION

The present invention relates to a bleed valve for tapping or bleeding a portion of the inlet air for a gas turbine engine, more particularly such a valve that is self regulating and which provides minimal disturbances in the air flow duct.

It is well-known in the art to tap or bleed a portion of the inlet air for a gas turbine engine to provide a pressure differential on opposite sides of bearing seals to preclude oil leaks, to cool or heat components of the turbojet engine in order to control operational clearances, or to provide air conditioning or warm air to an aircraft cabin.

As a rule, the air is tapped or bled at the gas turbine engine compressor and may be tapped between the low pressure compressor and the high pressure compressor, or from the cold air flow when the turbojet engine is the turbo fan type. The selection of the source of the bleed air depends upon the desired temperatures and pressures of the air.

Usually the air bleeding or tapping is carried out in an air flow of which the speed and pressure vary dramatically according to the operational mode of the gas turbine engine, or as a function of altitude or speed in the case of an aircraft turbojet engine.

The known bleed valves frequently suffer from the drawbacks of unnecessarily high cost and unnecessarily high weight, and may tap an excessive amount of air from the duct, especially under high power engine operation. Accordingly, the engine compressor must be oversized to ensure an adequate supply of air to the engine thereby increasing its cost and weight and lowering the efficiency of the compressor. Frequently, the excessive air tapping or bleeding deteriorates the efficiency of the elements to which the tapped air is supplied and may, for instance, increase oil consumption at the oil trap.

French Patent No. 2,257,787 discloses an air tapping device for use on a gas turbine engine compressor which comprises a butterfly valve located in the air flow conduit which is controlled by a piston subjected on one side to the upstream air pressure and on the other side to a spring biasing device and atmospheric pressure through a second valve. The piston and the valve shaft are linked by a link rod and a crank. This patent also discloses an air tapping device comprising a valve also designed as a piston subjected to the upstream pressure, the atmospheric pressure and a spring return force.

French Patent No. 2,680,832 discloses a device for tapping air from a gas turbine engine comprising an articulating and retractable conduit which, in its active position, intercepts a portion of the gas flow along a duct wall. This device also includes control means located outside of the conduit.

SUMMARY OF THE INVENTION

A self regulating bleed valve for a gas turbine engine is disclosed which taps or bleeds a portion of a gas, typically air, from a duct of the gas turbine having a wall bounding the gas flow. The bleed valve has a valve member pivotally attached to the wall such that the valve member extends through a main opening formed in the wall. The valve member has an internal cavity in communication with a gas inlet opening and a gas exhaust opening and is pivotally movable between an extended position wherein the gas inlet opening portion of the valve member extends into the gas flow duct such that the inlet opening faces generally in an upstream direction so as to deflect a portion of the gas flow into the internal cavity, and a retracted position wherein the inlet opening extends obliquely, generally parallel, to the gas flow so as to minimize the air tapped or bled from the gas flow. The bleed valve also include a control device fixedly attached to the valve member which is acted on by the flow of gas to cause the valve member to pivot between its extended and retracted positions, depending upon the speed and pressure of the gas flow. Thus, the self-regulating bleed valve taps or bleeds a generally constant amount of air regardless of the speed or pressure of the gas flow with which the valve is associated.

The pivot axis of the valve member extends generally transversely to the flow direction of the gas and may be located in the wall bounding the gas flow or adjacent to the wall and extending parallel to the wall.

In both its extended and retracted positions, a portion of the valve member extends outwardly from the wall in a direction away from the side of the wall bounding the gas flow and has an exhaust outlet to direct a portion of the gas flow toward a desired usage.

The control device may include a baffle extending from the valve member which is acted on by the gas flowing through the gas flow duct such that the forces exert a torque on the valve member urging it to pivot from its extended position toward its retracted position. Additional rotating torque forces may be generated by a shutter attached to the valve member and extending at least partially across the exhaust opening. A spring connected between the valve member and the gas flow duct structure biases the valve member toward its extended position. When the valve member is in its retracted position, the baffle still projects into the gas flow stream to keep the valve member in that position.

The valve member may also define one or more flow control openings located such that, when the valve member is in its extended position, the flow control openings are located in the gas flow, and when the valve member is in its retracted position, the flow control openings are located outside of the gas flow on an opposite side of the wall bounding the gas flow.

The present invention is especially advantageous when the gas flow is tapped from the compressor of a gas turbine engine insofar as it allows tapping of the air flow at lower pressures in the compressor since the valve member projecting into the gas flow recovers some air flow dynamic pressure and thereby permits a larger air outflow than if the tapping took place through the wall. Conversely, the valve member retracts into the wall when the speed of the air flow is high, thereby lowering the aerodynamic disturbances in the air flow from the compressor.

DETAILED DESCRIPTION OF THE PREFERRED EMBODIMENT

Figure 1:
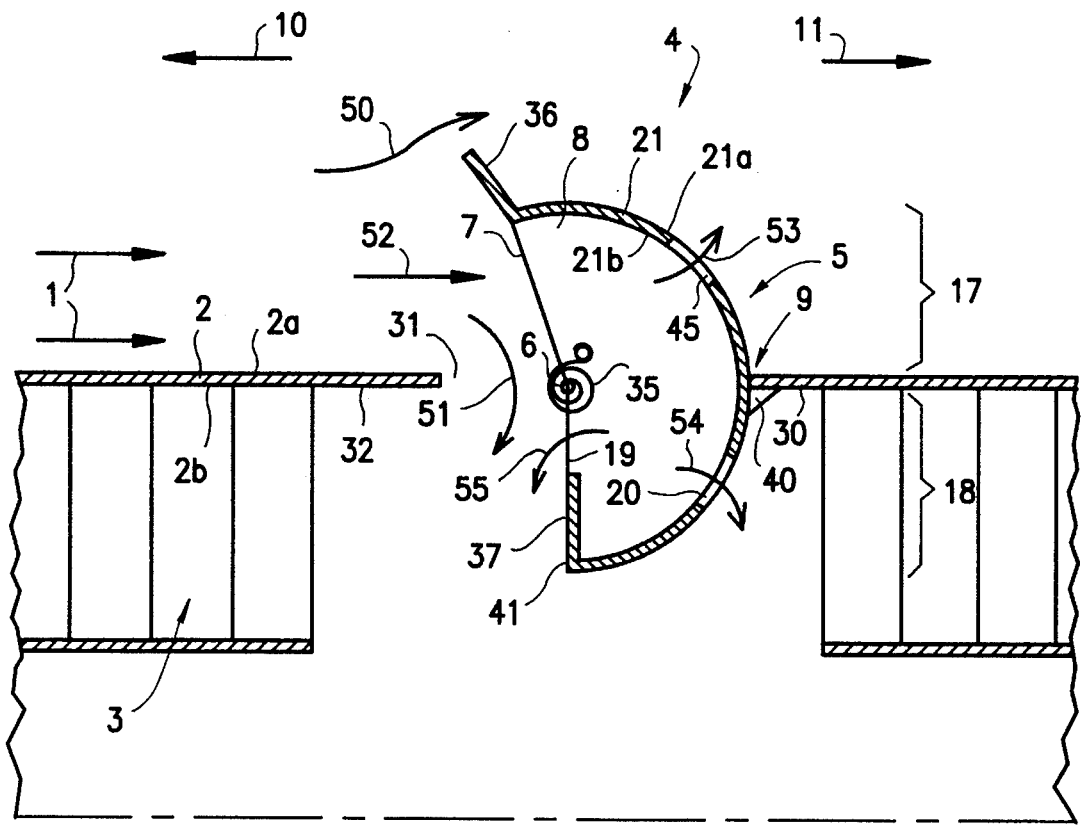
FIG. 1 is a cross-sectional view of the self regulating bleed valve according to the present invention with the valve member in its extended position.

As best illustrated in FIG. 1, the gas flow, in this particular instance air, 1 moves along a surface 2a of a wall 2 which bounds the gas flow. The wall 2 may be reinforced by a honeycomb structure 3 rigidly affixed to surface 2b, located opposite surface 2a of the wall 2. Honeycomb reinforcing structures 3 are well-known in the art and no further discussion of the particular details of this structure is believed to be necessary. The present invention also covers the case in which the air flow direction may vary, for instance, depending upon the mode of operation of the gas turbine engine, in which case the air flow 1 denotes the preferred flow direction. The air flow 1 flows from an upstream position to a downstream position, from left to right, as illustrated in the figures.

The air tapping apparatus 4 is located in the wall 2 and comprises a valve member 5 pivoting about a pivot axis 6 and having an inlet opening 7 communicating with an internal cavity 8 which passes across the wall 2 and also communicates with an exhaust opening 19. The valve member 5 passes through the wall 2 via a main opening 9. As can be seen, the internal cavity 8 constitutes a passage to move a portion of the air from the side 2a of the wall 2 to the side 2b. The valve member 5 pivots about axis 6 between an extended position, illustrated in FIG. 1, and a retracted position, illustrated in FIG. 2. In its extended position the valve member extends a maximum dimension into the air flow 1. The motion of the valve member between the extended and retracted positions is implemented by the valve member 5 rotating in a direction urged by a torque force exerted on the valve member by the air flow 1.

The pivot axis 6 is located in the wall 2 and extends generally transversely to the direction of the air flow 1. In a preferred embodiment, the axis 6 is located within the thickness of the wall 2 and extends perpendicular to the air flow 1. However, the axis 6 may also be located near the wall 2 and extend parallel to the wall across the airflow direction.

When the valve member 5 is in its extended position, the inlet opening 7 extends into the air flow 1 and faces substantially in an upstream direction 10. As can be seen, in this position the inlet opening 7 facing into the air flow 1 results in a maximum amount of air tapped from the air flow 1. When the valve member 5 pivots towards its retracted position, illustrated in FIG. 2, the inlet opening 7 extends at a progressively shallower angle relative to the air flow 1 to a final position in which it extends generally parallel to the air flow, thereby minimizing the amount of air tapped from the air flow 1.

The valve member 5 pivots about the axis 6 and moves through the main opening 9 in the wall 2 with only slight clearance to reduce air leaks. The overall shape of the valve member 5 is that of a sector of a toroid having a portion 17 which extends into the air flow and a portion 18 which extends from the opposite side of the wall 2 out of the air flow 1. The exhaust opening 19 is defined in the portion of the valve member extending outside of the wall 2. The valve member 5 may also define a second exhaust opening 20 located in the portion 18 which extends outwardly of the wall 2 on the opposite side of the air flow. The openings 7, 19 and 20 are all in communication with the internal cavity 8.

In a preferred embodiment, the valve member 5 comprises a thin wall 21 in which the ends define inlet and exhaust openings 7 and 19, respectively, and in which the outer surface 21a radially bounds the valve member 5, and an inner wall surface 21b which bounds the internal cavity 8. The inlet and exhaust openings 7 and 19 are each located in planes which intersect at, or adjacent to, the pivot axis 6.

In a first embodiment, the cross-section of the valve member 5 is generally semi-circular with its center coincident on the axis 6, such that the wall 21 assumes a generally spherical configuration. In a second embodiment, the cross-section of the valve member 5 is rectangular with one of its sides passing through the pivot axis 6. Thus, in this configuration, the wall 21 assumes the shape of a sector of a cylinder of revolution bounded by two planes extending perpendicular to the axis 6.

Preferably, the wall 2 has a clearance 30 located downstream of the main opening 9 on the surface 2b of the wall 2 that is free of the honeycomb structure, or other obstacles. The main opening 9 through the wall 2 is complementary in configuration to the cross-sectional configuration of the valve member 5. Upstream of the pivot axis 6 the main opening 9 may be extended by a complementary opening 31 in the wall 2 which may be separated from, or adjoin the main opening 19. The complementary opening 31 is symmetrical to the main opening 9 relative to the pivot axis 6. The opening 31 is bounded by a second clearance 32 on surface 2b that is free of the honeycomb structure or other obstacles.

Because of the generally toroidal shape of the valve member 5, the forces applied to the wall 21 by the air flow pressure do not exert any torque on the valve member, since all forces normal to the wall 21 pass through the pivot axis 6. The tapping apparatus 4 comprises a control means responsive to the speed and pressure of the air flow 1 which will exert a torque force on the valve member to control its positioning between its extended and retracted positions.

The control means may comprise a return spring 35, which may be a spiral spring, connected between the valve member 5 and the surrounding stationary structure, such as the wall 2, to normally bias the valve member 5 toward its extended position. The control means may also comprise a baffle 36 fixedly attached to the valve member 5 and extending therefrom so as to be acted on by the air flow 1. The baffle 36 extends from the portion 17 of the valve member 5 which extends into the air flow and comprises one or more surfaces which may be acted on by the air flow to provide a force exerting a torque on the valve member 5 tending to cause it to pivot about pivot axis 6 toward its retracted position. The baffle 36 may extend from the portion of wall 21 bounding the inlet opening 7 such that a force acting normally on the baffle 36 will act on the baffle upstream of the pivot axis 6.

The control means may also include, in combination with, or as a substitute for, the baffle 36, a shutter 37 extending inwardly from the wall 21 at the exhaust opening 19 at a location furtherest away from the pivot axis 6.

The forces acting on baffle 36 exert a torque on the valve member which is a function of the speed of the air flow 1. The forces acting on shutter 37 are generated by the static and dynamic pressures of the air flow 1 through the internal cavity 8 and also exert a torque force on the valve member 5. The torque forces acting on the baffle 36 and the shutter 37 are exerted in the same direction and are exerted contrary to the force of the return spring 35. Thus, the magnitude of the forces on baffle 36 and the shutter 37 may overcome the force of the return spring, thereby causing the valve member to pivot about pivot axis 6 toward its retracted position, illustrated in FIG. 2.

Figure 2:
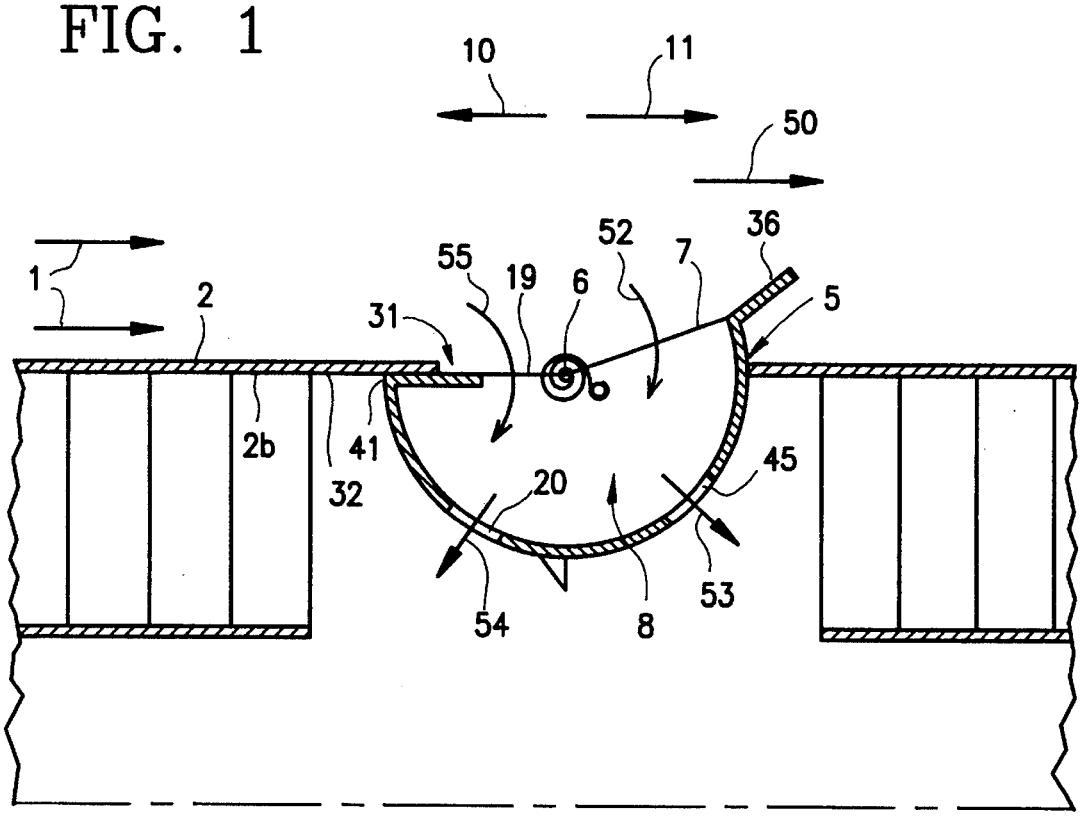
FIG. 2 is a view similar to FIG. 1, illustrating the valve member in its retracted position.

The valve member 5 also comprises means to limit the travel and define its extended and retracted positions. Stop 40 projects outwardly from the wall 21 on the portion 18 of the valve member 5 extending outwardly from wall 2 which will contact the wall 2 in the clearance portion 30 to limit the movement of the valve member and determine its extended position. In order to limit the retracted position of the valve member 5, end 41 of wall 21 bounding the exhaust opening 19 will contact wall 2 in the clearance 32, as illustrated in FIG. 2.

The valve member 5 also comprises air flow tapping control means comprising one or more flow control openings 45 located in the wall 21. The location of the flow control openings 45 is such that, when the valve member is in its maximum extended position, the flow control openings 45 are all located within the air flow 1 on the inner side of wall 2. When the valve member 5 is in its retracted position, the flow control openings 45 are located on the outer side of wall 2 out of the air flow 1. The flow control openings pass from one side to the other of the wall 2 depending upon the angular position of the valve member 5.

In operation, when the air flow 1 is slight, the torque applied to the valve member by the forces acting on baffle 36 and shutter 37 are also slight and the return springs 35 urge the valve member 5 into its maximum extended position, illustrated in FIG. 1, in which the stop 40 contacts wall 2 in the clearance 30. This will cause the air flow 1 adjacent to the wall 2 to split into several air flows upon arriving at the tapping apparatus 4: the partial air flow 50 moves around the valve member 5; the partial air flow 51 moves through the complementary opening 31; the partial air flow 52 enters the internal cavity 8 through the inlet opening and divides itself further into: a flow 53 which leaves the valve member through flow control opening 45; a flow 54 which leaves the valve member through the second exhaust opening 20; and a flow 55 which leaves through the exhaust opening 19 when this opening is incompletely sealed by the shutter 37. Thus, when the air flow 1 is slight, the tapped amount of air corresponds to the total of flows 51, 54 and 55.

When the speed of the air flow 1 increases, the forces acting on baffle 36 in the downstream direction 11 increase thereby urging valve member 5 to pivot about axis 6 towards its retracted position. As the valve member 5 pivots, the angle of the inlet opening 7 relative to the air flow 1 becomes smaller and smaller, whereby the flow 52 passing into the cavity 8 is reduced, thereby reducing flows 54 and 55. As a result, the amount of tapped air is also reduced. This effect is enhanced by the progressive sealing of the opening 31 by the shutter 37 thereby further reducing the flow 51. The flow 52 entering the internal cavity 8 also exerts a force against the inside wall of the shutter 37 aiding in the rotation of valve member 5 about axis 6 and further reducing the tapped air.

When the air flow 1 becomes large, as illustrated in FIG. 2 the valve member 5 pivots to its retracted position whereby end 41 contacts wall 2 at clearance 32. At this point, the opening 31 is covered by the baffle 37 and the exhaust opening 19 and the flow 55 reverses so as to flow into the cavity 8 through opening 19. Since baffle 36 remains projecting into the air flow 1 in this position, the air flow 1 still exerts a torque force on the baffle 36 to thereby keep the valve member 5 in its retracted position.

At low air flows, the flow control opening 45 is on the side of the wall 2 in the air flow 1 and the flow 53 passing through the valve member 5 reduces the quantity of trapped air. At high flows, on the contrary, the flow control openings 45 move to the other side of the wall 2 whereby the flow 53 passing through the flow control opening 45 adds to the quantity of tapped air. Accordingly, the flow control openings 45 of the valve member 5 which projected into the air flow 1 reduces the air flow at lower power and increases it at high power, the changeover taking place when the flow control openings pass from one side of wall 2 to the other side of wall 2. Flow control opening 45 also allows controlling the relationship between the trapped air and the operating mode at intermediate modes of operation. Several flow control openings of different sizes may be present in the valve member 5 to achieve any desired relationship between the amount of air tapped and the operating mode of the engine.

The self regulating bleed valve according to the present invention allows controlling the quantity of tapped air, or other fluid, regardless of substantial variations of pressure or speed of the air flow and it achieves a specific relationship, even if complex, between the amount of air tapped and the engine operating mode. The amount of air tapped may be increased during high air flow by increasing the force of the return springs 35. The amount of air tapped may be increased at relatively low air flows by enlarging the complementary opening 31 and/or by making the shutter 37 smaller. Air tapping may be decreased at higher air flows by making the second exhaust opening 20 smaller, or the tapping may be eliminated by eliminating the second exhaust opening 20 and the complementary opening 31. Air tapping at low air flows may be reduced while simultaneously increasing the air tapping during high air flows by situating one or more of the flow control openings 45 on the portion 17 of the valve member 5 extending into the air flow duct.

The present bleed valve apparatus is affected at lower air flows and introduces only small disturbances in the air flow during high air flows. During low air flows, the valve member 5 extends maximally into the air flow duct with the inlet opening 7 facing upstream into the air flow 1. The efficiency is heightened by the baffle 36. During high air flows, the valve member 5, in its retracted position, is almost entirely retracted into the wall 2 and presents only a minor obstacle to the air flow in the air flow duct.

The present invention differs from the scoop disclosed in French Patent No. 2,680,832 in which the air flow through the scoop moves upstream through its pivot axis. In the present invention, the air flow through the valve member 5 moves around the pivot axis 6 in a location downstream of the pivot axis. The directions of rotation and opening/closing are inverted whereby the air flow dynamic pressure biases the scoop opened rather than closed, this operation being contrary to the regulatory effect desired in the present invention.

The foregoing description is provided for illustrative purposes only and should not be construed as in any way limiting this invention, the scope of which is defined solely by the appended claims.

We claim:

1. A self regulating bleed valve for a gas turbine engine having a wall bounding a gas flow wherein the gas flows in an upstream to downstream direction, comprising:

a) a main opening formed in the wall;

b) a valve member having an internal cavity in communication with a gas inlet opening and a gas exhaust opening, said valve member being located in the main opening so as to pivot about a pivot axis extending substantially transverse to the gas flow between an extended position wherein the gas inlet opening extends into the gas flow and faces generally in an upstream direction, and a retracted position wherein the inlet opening is generally parallel to the gas flow; and, c) control means fixedly attached to the valve member and acted on by the gas flow such that the gas flow causes the valve member to pivot between its extended and retracted positions.

2. The self regulating bleed valve of claim 1 wherein the valve member has a configuration in the general shape of a sector of a toroid.

3. The self regulating bleed valve of claim i wherein the pivot axis is substantially coincident with the wall.

4. The self regulating bleed valve of claim 1 further comprising at least one second gas exhaust opening formed in the valve member communication with the internal cavity and located so as to be on an opposite side of the wall out of the gas flow in all positions of the valve member.

5. The self regulating bleed valve of claim i wherein the control means comprises at least one baffle member extending from the valve member and located so as to be in the gas flow in all positions of the valve member.

6. The self regulating bleed valve of claim 1 further comprising biasing means acting on the valve member to bias the valve member towards its extended position.

7. The self regulating bleed valve of claim 6 wherein the biasing means comprises at least one spiral torsion spring connected to the valve member.

8. The self regulating bleed valve of claim 1 wherein the main opening extends downstream from the pivot axis and further comprise a complementary opening in the wall extending upstream from the pivot axis.

9. The self regulating bleed valve of claim 8 wherein the portion of the complementary opening upstream of the pivot axis is aligned with the gas exhaust opening when the valve member is in its retracted position.

10. The self regulating bleed valve of claim 1 further comprising a flow control opening formed in the valve member communicating with the internal cavity and located so as to be on one side of the wall in the gas flow when the valve member is in its extended position and to be on an opposite side of the wall out of the gas flow when the valve member is in its retracted position.

11. The self regulating bleed valve of claim 1 wherein the control means comprises a shutter located on the valve member and extending into the exhaust opening.

* * * * *